Patented Aug. 26, 1930

1,774,432

UNITED STATES PATENT OFFICE

REGINALD GEORGE FRANKLIN, OF BILLINGHAM, STOCKTON-ON-TEES, ENGLAND, ASSIGNOR TO IMPERIAL CHEMICAL INDUSTRIES LIMITED, OF LONDON, ENGLAND, A BRITISH COMPANY

CATALYSTS FOR THE CATALYTIC PRODUCTION OF METHANOL AND OTHER OXYGENATED ORGANIC COMPOUNDS FROM OXIDES OF CARBON AND HYDROGEN

No Drawing. Application filed October 13, 1927, Serial No. 226,043, and in great Britain November 15, 1926.

Among numerous catalysts for the synthesis of methanol and other organic compounds from hydrogen and carbon monoxide it has been proposed to employ compositions containing zinc and chromium oxides containing various ratios of zinc and chromium, and it has been proposed to prepare these in various ways.

I have now discovered that a very good way to prepare these catalysts is to employ zinc carbonate or basic zinc carbonate as a basis for the preparations of zinc-chromium compositions, especially by the reaction between the zinc carbonate or basic zinc carbonate and a soluble chromium compound. Such catalysts are particularly effective when the molecular ratio of zinc to chromium is nine to one (Zn: Cr).

Thus according to the present invention in its preferred form zinc carbonate or basic carbonate is treated with chromic acid in aqueous solution, the product is dried and brought into a suitable form e. g. pellets for introduction into a converter where it is exposed to a gaseous mixture containing carbon monoxide and hydrogen. After reduction of the catalyst, the synthesis of methanol may be carried on in the usual manner.

The following examples illustrate my invention:—

Example 1

700 gms. of zinc sulphate, $ZnSO_4, 7H_2O$, are dissolved in 5 litres of water and a solution of 270 gms of soda ash ($Na_2CO_3$) is added to the solution. The mixture is boiled for 10 minutes and then the precipitate is filtered off and washed until the washings are free from sodium sulphate. The moist precipitate of basic zinc carbonate is then digested with a solution of 95 gms of chromic acid ($CrO_3$) in 9 litres of water. The precipitate is filtered off, dried and formed into suitable granules or pellets for introduction into the catalytic apparatus.

The zinc carbonate may also be precipitated on a carrier such as asbestos or pumice, by impregnating same with the solution of zinc sulphate and then treating with a soluble carbonate. The zinc-carbonated carrier may then be treated with chromic acid solution as before.

The proportion of chromic acid mentioned above represents a considerable excess, since only about 20% is fixed by the zinc carbonate. The excess, however, is necessary in the method of preparation according to this example, as if smaller proportions are employed a correspondingly smaller amount is fixed by the zinc carbonate.

Example 2

A solution of 40 gms of zinc sulphate is added to a solution of 15 gms of soda ash and 11 gms of sodium bichromate, the total volume of solution being about 9—10 litres. After boiling for several minutes the precipitate is filtered off and washed and dried. It is then suitable for introduction into the catalytic apparatus.

The composition of the precipitate varies with slight changes in the conditions of preparation, and in making my preferred catalyst (having a ratio Zn : Cr of 9 : 1) it is necessary to test the final product to be sure that the desired ratio has been obtained and if not, the preparation must be repeated. The invention also includes catalysts prepared as above and containing more or less chromium e. g. 2% by weight of the finished catalyst.

The reduction of the catalyst prior to its use should be carried out as carefully as possible with strict avoidance of overheating.

When the catalyst contains soluble alkali salts and when the gas current is slower and the temperature somewhat higher, higher alcohols and other organic compounds are produced.

The invention includes the novel catalysts, and their method of production and the synthesis of methanol or other organic compounds by their aid.

The expression "a zinc carbonate" is used to denote zinc carbonate or basic zinc carbonate. The soluble cromium compound is described as reacting with a zinc carbonate whether the carbonate is added as solid or precipitated in situ.

I declare that what I claim is:—

1. The process of preparing a catalyst for the production of oxygenated organic compounds, particularly methanol, from carbon monoxide and hydrogen which includes the step of heating a mixture containing a zinc carbonate and a zinc chromate to decompose the carbonate.

2. The process of preparing a catalyst for the production of oxygenated organic compounds, particularly methanol, from carbon monoxide and hydrogen, which consists in heating a mixture containing a zinc carbonate and a zinc chromate to decompose the carbonate in presence of a reducing gas.

3. The process of preparing a catalyst for the production of oxygenated organic compounds, particularly methanol, from carbon monoxide and hydrogen which consists in heating a mixture containing a zinc carbonate and a zinc chromate to decompose the carbonate in presence of the reaction gases.

4. Method of preparing a catalyst for the production of oxygenated organic compounds, particularly methanol from carbon monoxide and hydrogen, which includes the step of causing a soluble acidic chromium compound to react with excess of a zinc carbonate.

5. Method of preparing a catalyst for the production of oxygenated organic compounds particularly methanol from carbon monoxide and hydrogen, which consists in causing a soluble acidic chromium compound to react with excess of a zinc carbonate, drying the precipitate, heating it to decompose the carbonate and reducing it.

6. Method of preparing a catalyst for the production of oxygenated organic compounds, particularly methanol, from carbon monoxide and hydrogen which includes the step of precipitating a soluble zinc salt with a salt of chromic acid in presence of a soluble carbonate.

7. Method of preparing a catalyst for the production of oxygenated organic compounds, particularly methanol, from carbon monoxide and hydrogen which includes the step of precipitating a soluble zinc salt with an acid salt of chromic acid, in presence of a soluble carbonate.

8. Method of preparing a catalyst containing zinc and chromium in the molecular ratio of about nine to one, which includes the step treating excess of zinc carbonate with chromic acid in slight excess over the theoretical amount.

9. Catalyst consisting of the heated and reduced reaction product of a zinc salt, a carbonate and a salt of chromic acid.

10. Catalyst consisting of the heated and reduced reaction product of a zinc salt, a carbonate and a salt of chromic acid in which the molecular ratio of zinc to chromium is about nine to one.

11. Process of preparing a catalyst for the production of oxygenated organic compounds, particularly methanol, from carbon monoxide and hydrogen which includes the step of heating a mixture containing a zinc carbonate and a chromium compound, not chemically changed by heat, so as to decompose the zinc carbonate.

In witness whereof, I have hereunto signed my name this 29th day of September, 1927.

REGINALD GEORGE FRANKLIN.